United States Patent
Seitz et al.

(10) Patent No.: US 10,092,128 B2
(45) Date of Patent: Oct. 9, 2018

(54) VARIABLE SPEED STEAM COOKER

(75) Inventors: Craig A. Seitz, Decatur, IN (US); Larry R. Wolf, Avilla, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 562 days.

(21) Appl. No.: 13/476,646

(22) Filed: May 21, 2012

(65) Prior Publication Data

US 2012/0318252 A1    Dec. 20, 2012

Related U.S. Application Data

(63) Continuation-in-part of application No. 13/475,717, filed on May 18, 2012, now abandoned.

(60) Provisional application No. 61/488,246, filed on May 20, 2011.

(51) Int. Cl.
| | |
|---|---|
| *A47J 27/04* | (2006.01) |
| *A47J 39/00* | (2006.01) |
| *A47J 27/16* | (2006.01) |

(52) U.S. Cl.
CPC ............. *A47J 27/04* (2013.01); *A47J 27/16* (2013.01); *A47J 39/006* (2013.01)

(58) Field of Classification Search
CPC .................................. A47J 27/04; A47J 27/16
See application file for complete search history.

(56) References Cited

U.S. PATENT DOCUMENTS

| | | | | |
|---|---|---|---|---|
| 4,506,598 A | * | 3/1985 | Meister | F24C 15/327 126/20 |
| 5,549,038 A | * | 8/1996 | Kolvites | 99/330 |
| 5,767,487 A | | 6/1998 | Tippmann | |
| 6,107,605 A | | 8/2000 | Creamer et al. | |
| 6,175,100 B1 | | 1/2001 | Creamer et al. | |
| 6,455,085 B1 | * | 9/2002 | Duta | 426/233 |
| 7,810,488 B2 | | 10/2010 | Manganiello et al. | |
| 8,525,081 B2 | | 9/2013 | Colburn et al. | |
| 2003/0178411 A1 | * | 9/2003 | Manganiello | A47J 27/04 219/496 |
| 2010/0199860 A1 | | 8/2010 | Seitz et al. | |
| 2012/0295002 A1 | | 11/2012 | Seitz et al. | |

OTHER PUBLICATIONS

Office Action dated Jun. 20, 2014 in corresponding U.S. Appl. No. 13/475,717.
Notice of Abandoned dated Jan. 9, 2015 in corresponding U.S. Appl. No. 13/475,717.

(Continued)

*Primary Examiner* — Ibrahime A Abraham
*Assistant Examiner* — John J Norton
(74) *Attorney, Agent, or Firm* — Faegre Baker Daniels LLP

(57) ABSTRACT

A user-manipulable apparatus uses a steam generator responsive to pressure while also allowing the user to increase or decrease cooking speed, water consumption and energy efficiency of a steam cooker as desired. In one exemplary embodiment, a steam cooker includes a variable-area vent orifice and a steam generator responsive to pressure in the cooking chamber. If the pressure in the cooker is lower than desired, more steam is generated until the pressure reaches a predetermined set point. If the pressure is higher than desired, steam generation is slowed or stopped until the pressure lowers to a predetermined set point.

22 Claims, 13 Drawing Sheets

(56) References Cited

OTHER PUBLICATIONS

Restriction Required dated Jun. 14, 2013 in corresponding U.S. Appl. No. 13/475,717.
Election dated Jul. 15, 2013 in corresponding U.S. Appl. No. 13/475,717.
Restriction Requirement dated Nov. 25, 2013 in corresponding U.S. Appl. No. 13/475,717.
Election dated Apr. 25, 2014 in corresponding U.S. Appl. No. 13/475,717.
AccuTemp Products, Inc., Product Specification, "Steamer Electronic Temperature and Timer Control", Nov. 25, 2009.
Cleveland Controls, Series RSS-495/498, "OEM Air Pressure Sensing Switches with Fixed Set Point".
AccuTemp Products, Inc., Service Manual, "Steam 'N' Hold".
George Foreman, Product Information, Smart Kitchen Multicooker, 2010.

* cited by examiner

VARIABLE SPEED STEAM COOKER

CROSS-REFERENCE TO RELATED APPLICATIONS

This application claims the benefit under Title 35, U.S.C. § 119(e) of U.S. Provisional Patent Application Ser. No. 61/488,246, entitled VARIABLE SPEED STEAM COOKER and filed on May 20, 2011, the entire disclosure of which is hereby expressly incorporated by reference herein. This application is a continuation-in-part of U.S. patent application Ser. No. 13/475,717, entitled VARIABLE SPEED STEAM COOKER and filed on May 18, 2011, the entire disclosure of which is hereby expressly incorporated by reference herein.

BACKGROUND

1. Technical Field

The present disclosure relates to steam heated cooking devices, and more particularly, to a user adjustable apparatus for altering cooking speed, water usage and energy efficiency in a steam heated cooking device.

2. Description of Related Art

Steam cookers are widely used in commercial food service applications because they can rapidly re-warm or cook large quantities of food while maintaining excellent food quality. In order to heat and/or cook food in a steam cooker, water is heated until it changes phase to become steam. The steam is then circulated through the cooker using a fan or other circulation mechanism to allow the steam to contact the food and increase the temperature of the food.

Air acts as an insulator around food in steam cookers, slowing the cooking process. To alleviate this problem, air may be purged from the cooker either through an open vent to atmosphere, a drain, a condenser or a vacuum pump.

Some steam cookers, including many for use in commercial applications, supply a large volume of steam to the cooker continuously. Any steam not condensed by the food is vented from the steamer. In many cases, the vented steam quantity is sufficiently large to warrant the use of a cold water condenser, which condenses excess vented steam back into liquid water before routing it to a drain. While these high-volume steamers can cook food quickly, they are also very energy inefficient because substantial heat energy in the vented and condensed steam is lost to the surrounding environment.

In addition to energy consumption, large volumes of water are also used in the condenser. In some cases, this condenser wastewater may be up to 60 gallons per minute, leading to substantial operational expense. Further, steamers which use such large volumes of water must be connected to a potable water supply and plumbed into a drain, further exacerbating the expense and complexity of their use.

Thus, managing water and energy usage has been the subject of substantial design efforts. Some known steam cookers use pressure or temperature measurement to control the amount of steam supplied to the food chamber or generated in the cooker. These cookers achieve higher levels of energy efficiency, use less water and may not require the use of water and drain lines.

For example, one known steam cooker utilizes a steam-cooking apparatus with a control system which operates to maintain a constant pressure and/or water temperature within the cooker. This is the Steam 'N' Hold steam cooker, available from AccuTemp Products, Inc. of Fort Wayne, Ind., and described in a publication entitled "AccuTemp Steam 'N' Hold Service Manual, Serial Numbers 25384 and Up," a copy of which is submitted on even date herewith in an information disclosure statement, the entire disclosure of which is hereby expressly incorporated herein by reference. The Steam 'N' Hold steam cooker reduces the internal atmospheric pressure of the cooking chamber, thereby lowering the temperature at which water begins to boil. This allows the operator to control the temperature of the steam for cooking Controlling the steam temperature gives the operator the ability to cook the food to the desired temperature without over-cooking. Once the cooking time expires, the Steam 'N' Hold steam cooker automatically enters a "Hold" mode in which a thermostat regulates the internal temperature of the cooking chamber and the vacuum is released to return the cooking chamber to normal atmospheric pressure. In this "Hold" mode, steam is no longer generated and the cooking chamber is held at the desired temperature at a relative humidity of 100%.

While the AccuTemp Steam 'N' Hold steam cooker does reduce operational costs related to energy and water consumption, cookers using lower steam throughputs cook more slowly than cookers that vent large amounts of steam.

Another known device is the Smart Kitchen Multicooker shown and described in the brochure entitled "Smart Kitchen Multicooker, George Foreman Healthy Cooking" a copy of which is submitted on even date herewith in an information disclosure statement. The Smart Kitchen Multicooker utilizes a constant power input, which ultimately determines the amount of steam produced. That is to say, once the cooker is at temperature (i.e., the water in the cooker is boiling), essentially all the power input to the device is used to generate steam. A variable vent is provided to prevent the lid of the device from lifting, which would allow steam to escape. The size of the vent may be adjusted to whatever size is necessary to keep the lid engaged with the steam vessel. Vent adjustment in the Smart Kitchen Multicooker does not affect steam generation, energy usage or cooking speed. Rather, these quantities are determined solely by the temperature control setting; once the cooker is warmed up to a stable cooking temperature, the amount of power input is directly correlated to the temperature control setting and is unaffected by the size of the vent.

An improvement over the foregoing is desirable.

SUMMARY

The present disclosure provides a user-manipulable apparatus using a steam generator responsive to pressure, in which the user can increase or decrease cooking speed, water consumption and energy efficiency of a steam cooker as desired. In one exemplary embodiment, a steam cooker includes a variable-area vent orifice and a steam generator responsive to pressure in the cooking chamber. If the pressure in the cooker is lower than desired, more steam is generated until the pressure reaches a predetermined set point. If the pressure is higher than desired, steam generation is slowed or stopped until the pressure lowers to a predetermined set point.

Steam flow through the steam cooker is selectively controlled by the area of the vent. In an exemplary embodiment, the size of a steam vent aperture in the steam cooker is large, but the effective size of the aperture is selectively reduced with a plug, plate, sheet or other device which partially or completely covers the vent orifice. The plug, plate, sheet or other device may be formed from solid material partially or fully covering the aperture, or may have at least one hole formed therethrough to allow partial venting at all times.

Selection of a large-area flow hole causes more steam to be vented from the food chamber, increasing steam generation and flow through the cooking chamber and increasing cooking speed and water consumption but reducing energy efficiency. Conversely, selection of a small-area flow hole reduces the amount of steam vented from the chamber, reducing cooking speed and water consumption, but increasing energy efficiency.

In one illustrated embodiment, a plate or sheet with several different size holes in it is used to cover the vent orifice. The holes are located in the plate or sheet such that only one hole at a time permits flow through the vent. The plate or sheet is positioned over the vent by the user such that the size of the hole over the vent provides a desired combination of cooking speed, water consumption and energy efficiency.

In one illustrated embodiment of the present disclosure, a steam cooker comprises: a cooking chamber having a vent orifice in fluid communication with an atmosphere outside the cooking chamber, the vent orifice defining a variable effective orifice area; a pressure sensor in fluid communication with the cooking chamber, the pressure sensor defining a first state corresponding to pressure below a setpoint and a second state corresponding to pressure above the setpoint; and a steam generator including a heater, the steam generator being in fluid communication with the cooking chamber, such that the steam generator is configured to inject steam into to the cooking chamber, the pressure sensor operably connected to the steam generator, such that when the pressure sensor is in the first state the steam generator injects steam into the cooking chamber until the pressure in the cooking chamber reaches a pressure within a predetermined deviation from the setpoint, and such that when the pressure sensor is in the second state the steam generator does not inject steam into the cooking chamber until the pressure in the cooking chamber falls to a pressure within a predetermined deviation from the setpoint.

In another illustrated embodiment of the present disclosure, a method is provided for heating an item to a desired temperature in a cooking chamber of a steam cooking device, the cooking chamber having a vent orifice in fluid communication with the cooking chamber and a surrounding atmosphere, the vent orifice having a variable effective area, the method comprising: setting a desired pressure level for the cooking chamber of the steam cooking device; ascertaining desired cooking parameters related to operation of the steam cooking device, the cooking parameters including at least one of a cook time, an energy consumption rate and a water consumption rate; setting a first effective vent orifice size when said step of ascertaining comprises choosing a first cooking time; and setting a second effective vent orifice size larger than the first orifice size when said step of ascertaining comprises choosing a second cooking time less than the first cooking time.

In yet another illustrated embodiment of the present disclosure, a steam cooker comprises: a cooking chamber having a vent orifice in fluid communication with an atmosphere outside the cooking chamber, the vent orifice defining a variable effective orifice area; means for generating steam, the means for generating steam in fluid communication with the cooking chamber; means for determining a pressure within the cooking chamber; means for comparing pressure to in the cooking chamber to a setpoint; means for controlling injection of steam produced by the means for generating steam, the means for controlling based on results of a comparison performed by the means for comparing; and means for selectively varying the effective orifice area.

DETAILED DESCRIPTION

Figure 1A:
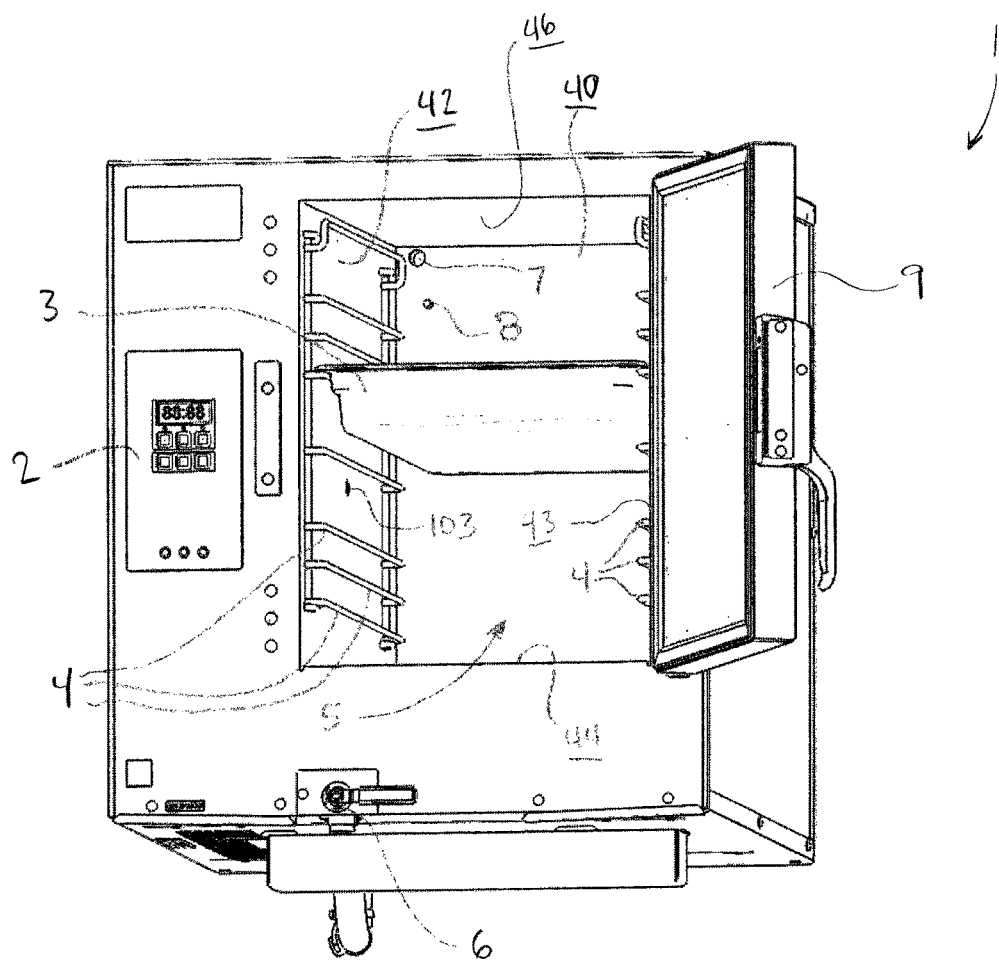
FIG. 1A is a perspective view of a commercial food service steamer with a fixed-area vent aperture in fluid communication with the surrounding atmosphere.

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 1B:
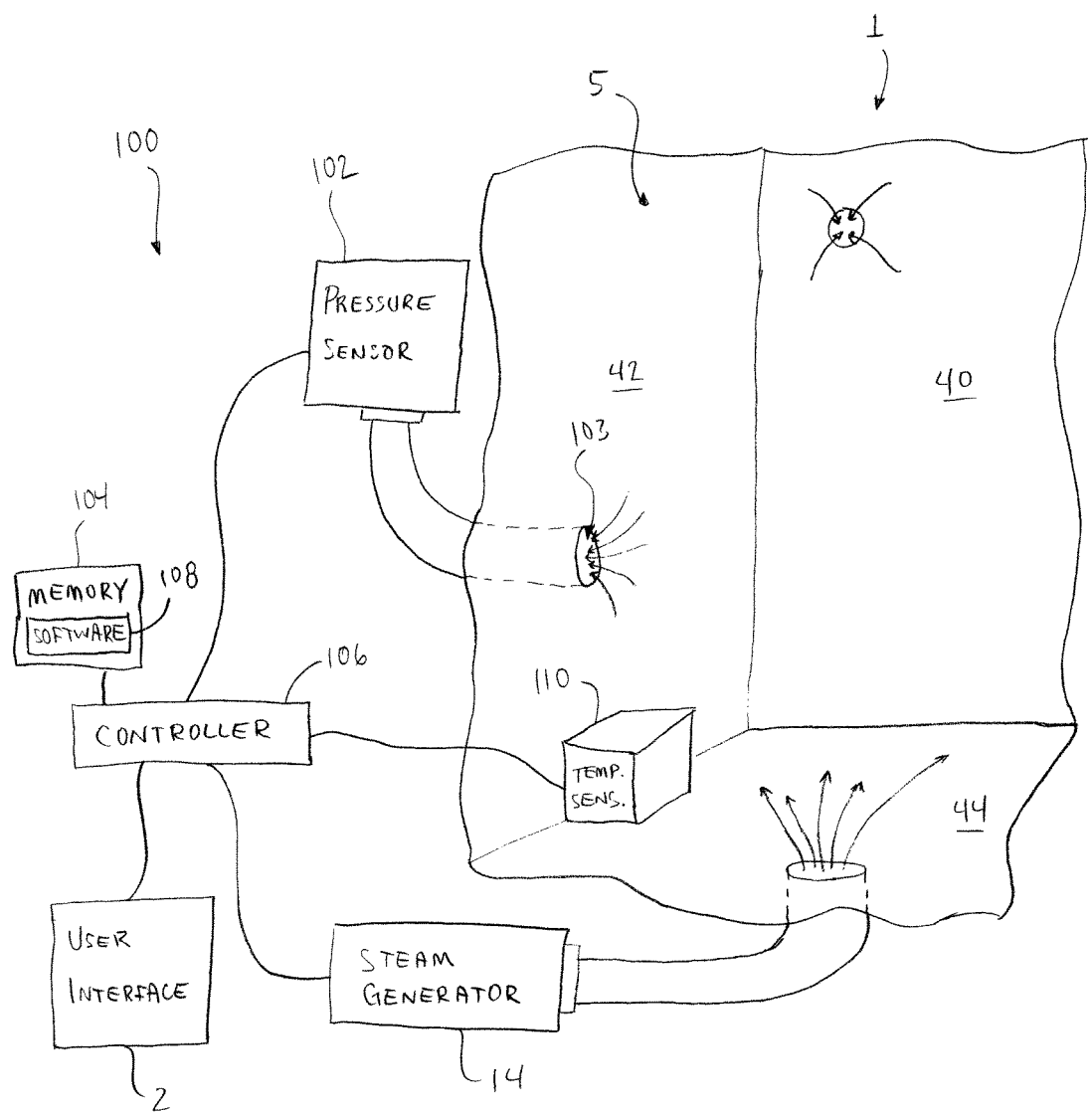
FIG. 1B is a schematic view of the commercial food service steamer shown in FIG. 1A, illustrating operation thereof.

Referring to FIG. 1B, a computing system 100 is shown. Computing system 100 includes a memory 104 which is accessible by a controller 106. Controller 106 executes software 108 stored on the memory 104. Memory 104 is a computer readable medium and may be a single storage device or may include multiple storage devices, located either locally with computing system 100 or accessible across a network. Computer-readable media may be any available media that may be accessed by controller 106 of computing system 100 and includes both volatile and non-volatile media. In one exemplary embodiment, computing system 100 is a microcontroller or application-specific integrated circuit (ASIC) combining inputs, outputs and memory on a single microchip. In another embodiment, computing system 100 is a programmable logic controller (PLC). In another embodiment, controller 106 is a microprocessor coupled to a separate memory 104.

For other embodiments, such as those in which steam cooker 1 is part of a larger system, computing system 100 may be a general purpose computer or a stand-alone computing device such as a desktop computer, a laptop computer, or a tablet computer. Although computing system 100 is illustrated as a single computing system, it should be understood that multiple computing systems may be used together, such as over a network or other methods of transferring data. Where steam cooker 1 is part of a larger network of systems, software 108 may further include communications software, if computing system 100 has access to a network, such as a local area network, a public switched network (e.g., the Internet), a CAN network, any type of wired network, of any type of wireless network.

Software 108 of memory 104 also includes operating system software. An exemplary operating system software is a WINDOWS operating system available from Microsoft Corporation of Redmond, Wash. Where steam cooker 1 is part of a larger network of systems, software 108 may further include communications software, if computing system 100 has access to a network, such as a local area network, a public switched network (e.g., the Internet), a CAN network, any type of wired network, of any type of wireless network.

As described in detail below, controller 106 of computing system 100 receives inputs from pressure sensor 102 and/or temperature sensor 110 to assess the state of steam cooker 1, as well as user inputs from user interface 2. Controller 106 then utilizes software 108 stored on memory 104 to selectively activate or deactivate steam generator 14 to maintain constant pressure and/or temperature within cooking chamber 5 of steam cooker 1.

User manipulation of the functions of steam cooker 1 is primarily achieved by interaction with user interface 2. More particularly, user interface 2 includes function switches which send signals to controller 106 to toggle main power to steam cooker 1, set cook times or desired or temperature or pressure levels, and other functions. Inputs received by controller 106, such as temperature or pressure of cooking chamber 5, can also be displayed and monitored by a user via the display functions of user interface 2.

1. Steam Cooker Configuration

Turning now to FIG. 1A, commercial food service steam cooker 1 is illustrated with a fixed-area vent orifice 7 formed in back wall 40, through which steam may be continuously vented from cooking chamber 5 to the surrounding atmosphere. A mounting stud or bolt 8 is attached to back wall 40 of cooking chamber 5, and is sized as positioned to hold at least one of aperture restrictors 10, 18, 23, 31, 35, 36 against orifice 7 to partially restrict steam flow therethrough, as described in detail below. In the illustrated embodiments shown in the various figures, restrictors 10, 18, 23, 31, 35, 36 are mounted to an inside wall of cooking chamber 5, though it is appreciated that such restrictors may also be mounted outside cooking chamber 5 as required or desired, such as for ease of restrictor adjustment.

In the exemplary embodiment shown in FIG. 1A, cooking chamber 5 includes a plurality of horizontally disposed racks 4 adapted to receive and support hotel pans 3. Hotel pans 3 are commonly used to contain and serve food, as described below. A plurality of pans 3 may be received within cooking chamber 5 so that multiple food items may be cooked and/or heated simultaneously. Door 9 may be opened to insert or retrieve pans 3 from chamber 5, and may be closed to close and substantially seal chamber 5 from the outside atmosphere, except for the controlled fluid communication with the surrounding atmosphere via vent orifice 7 as described herein. When closed, door 9 forms a front wall of cooking chamber 5 opposite back wall 40. Side walls 42, 43 are also mutually opposed and span the distance between the front wall of door 9 and back wall 40, with racks 4 mounted to walls 42, 43. Floor 44 and ceiling 46 are also mutually opposed and span the distances between the front wall and rear wall 40, and between side walls 42, 43.

Figure 2:
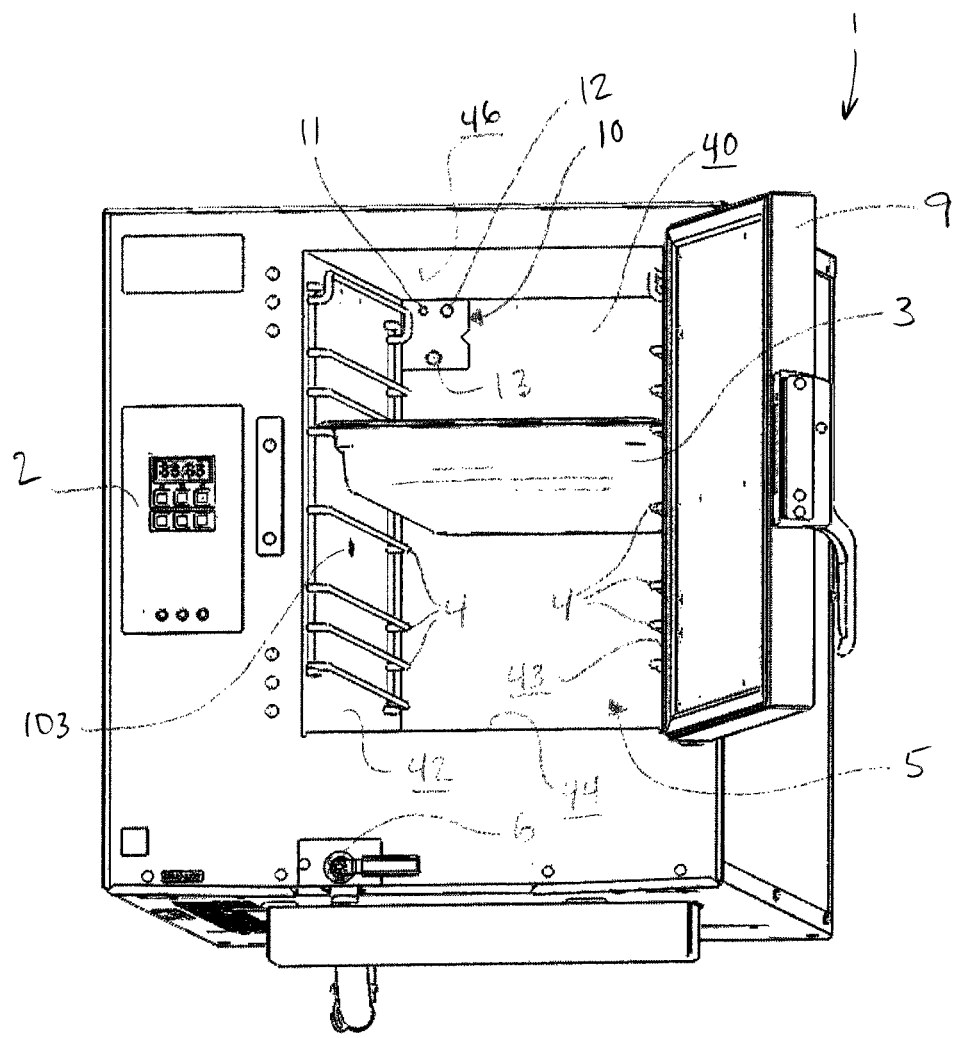
FIG. 2 is a perspective view of the commercial food service steamer shown in FIG. 1A, with a restrictor partially covering the fixed-area vent aperture.

Referring now to FIG. 2, vent restrictor 10 is shown installed within steam cooker 1 of FIG. 1A. In this installed position, restrictor 10 is adjacent to or abutting back wall 40 and positioned near vent orifice 7 so as to selectively restrict the effective area of orifice 7 as described below. Plate 10 is installed in steam cooker 1 by passing stud 8 through bolt hole 17 (FIG. 3) and securing restrictor plate 10 in place with nut 13. In the illustrated configuration, restrictor 10 is positioned to align flow hole 11 with vent orifice 7, such that area flow hole 11 substantially overlaps a portion of the area of orifice 7. However, flow hole 11 is smaller than vent orifice 7, such that flow hole 11 blocks access to a portion of orifice 7 by steam flowing from cooking chamber 5 to the outside atmosphere.

Restrictor 10 also includes second flow hole 12, which has a different size (i.e., a different overall area) than flow hole 11. Second flow hole 12 is shown misaligned with vent orifice 7, such that second flow hole 12 is positioned over rear wall 40. As such, no venting occurs through second flow hole 12 in the illustrated configuration of restrictor 10. However, restrictor 10 can be repositioned by pivoting restrictor 10 about the longitudinal axis of stud 8 (FIG. 1A). Because restrictor 10 is substantially parallel to back wall 40 and the longitudinal axis of stud 8 is substantially normal to back wall 40, such pivoting misaligns first flow hole 11 from vent orifice 7 and aligns flow hole 12 such that the area of second flow hole 12 substantially overlaps the area of vent orifice 7. As described in detail below, the differing sizes of flow holes 11, 12 and their selective alignment with vent orifice 7 allows the effective size of vent orifice to be quickly, selectively expanded or contracted by the user by a simple adjustment.

Figure 3:
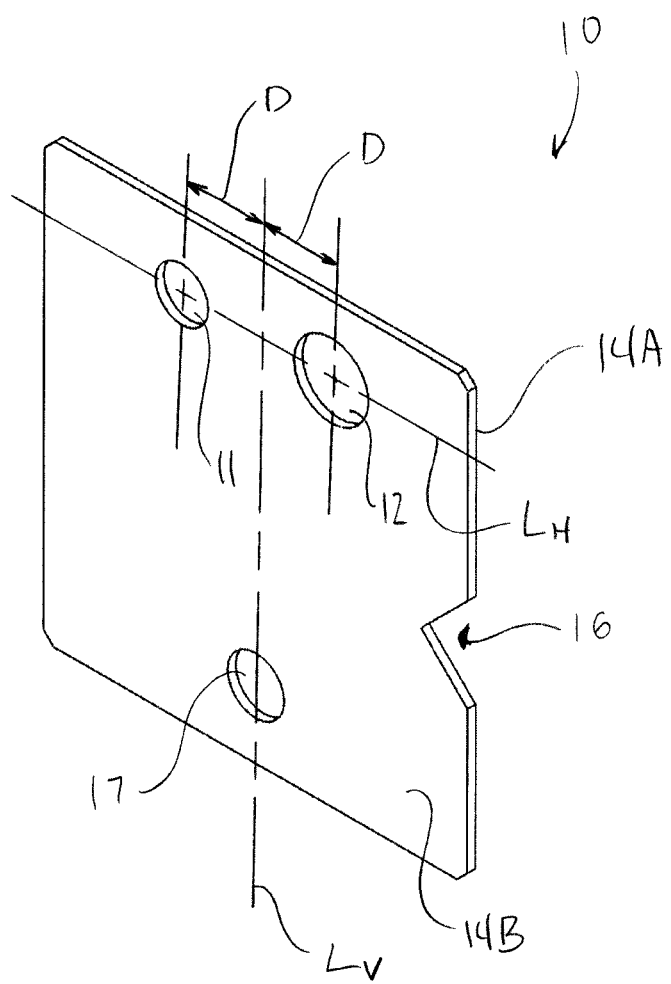
FIG. 3 is a perspective view of a vent restrictor plate having two different size flow holes.

FIG. 3 shows a more detailed view of restrictor plate 10 shown installed in steam cooker 1 of FIG. 2. Flow holes 11 and 12 are different sizes and are located such that when the restrictor plate is installed in steam cooker 1 only one of flow holes 11, 12 can align with vent orifice 7. When the area of first flow hole 11 is positioned to overlap the area of vent orifice 7, second flow hole 12 abuts rear wall 40 of cooking chamber 5. Thus, venting of steam from chamber 5 to the surrounding atmosphere occurs via first flow hole 11 only.

Flow holes 11 and 12 are spaced equidistantly from an imaginary vertical line $L_V$ through the center of bolt hole 17, such that the center of each of holes 11, 12 defines the same distance D from line $L_V$. In addition, holes 11, 12 and both disposed along a common horizontal line $L_H$, with horizontal line $L_H$ substantially perpendicular to vertical line $L_V$. Thus, toggling from alignment of one of flow holes 11, 12 with vent orifice 7 to alignment of the other of flow holes 11, 12 can be accomplished by removing restrictor plate 10, rotating restrictor 10 180 degrees about vertical line $L_V$, and reinstalling it in steam cooker 1. In the illustrated embodiment, abutting first face 14A of restrictor 10 to back wall 40 results in alignment of first flow hole 11 with vent orifice 7, while abutting a second, opposing face 14B of restrictor 10 to back wall 40 results in alignment of second flow hole 12 with vent orifice 7.

An optional orientation feature 16 may be provided as a quick visual reference as to which of holes 11, 12 is aligned over vent orifice 7. If orientation feature 16 is spaced away from side wall 42, first hole 11 is aligned; if orientation feature 16 is next to side wall 42, second hole 12 is aligned.

In an exemplary embodiment, bolt hole 17 has a diameter of 0.375 inch for mounting restrictor 10 in steam cooker 1. Vent orifice 7 (FIG. 1A) has a diameter of 0.625 inch. First flow hole 11 of restrictor 10 has a diameter of 0.313 inch, while second flow hole 12 of restrictor 10 has a diameter of 0.438 inch. With this configuration, three different effective diameters of vent orifice 7 can be selected by the user. With restrictor 10 removed, vent orifice 7 is 0.625 inch. With restrictor 10 installed with orientation feature 16 spaced away from side wall 42 (and first face 14A abutting back wall 40), vent orifice 7 is partially blocked such that its effective size is equal to the diameter of first flow hole 11, i.e., 0.313 inch. With restrictor 10 installed with orientation feature 16 next to side wall 42 (and second face 14B abutting back wall 40), vent orifice 7 is partially blocked such that its effective size is equal to the diameter of second flow hole 12, i.e., 0.438 inch.

Figure 4:
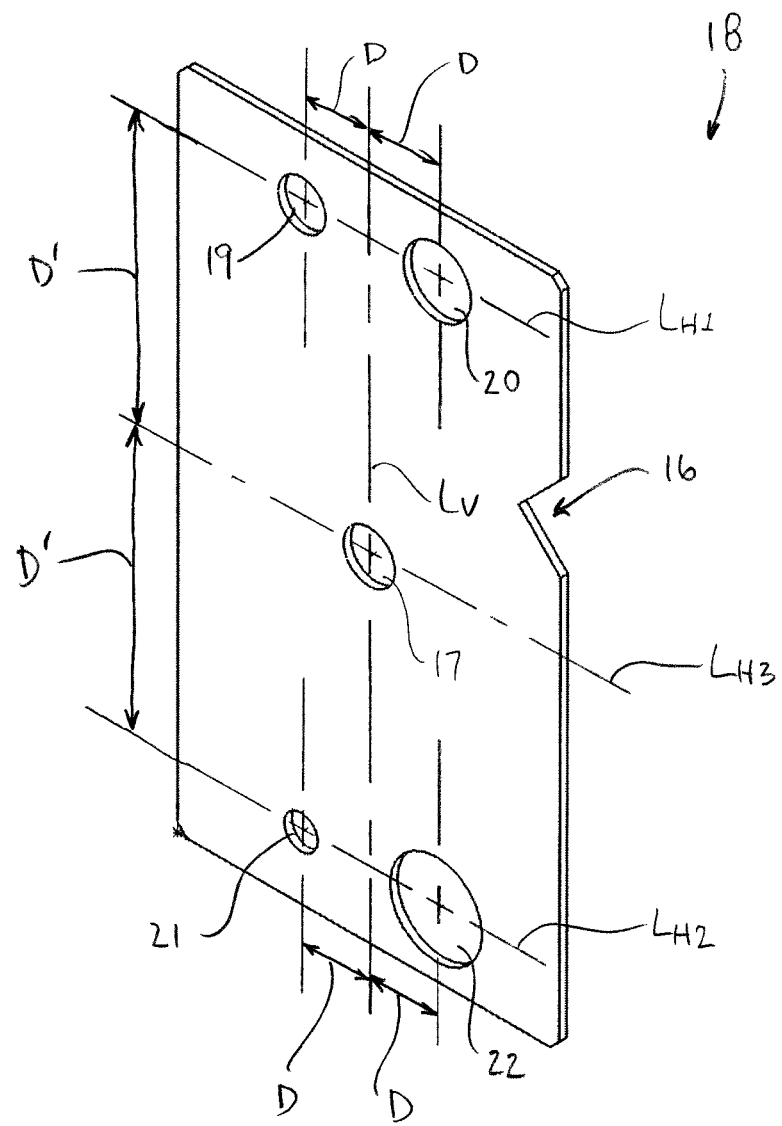
FIG. 4 is a perspective view of another vent restrictor plate having four different size flow holes.

FIG. 4 illustrates an alternative restrictor 18 with four different size flow holes 19, 20, 21, 22, sized and positioned such that any one of holes 19, 20, 21, 22 can be placed over vent orifice 7 at any one time. Holes 19, 20, 21, 22 are also spaced equidistantly from bolt hole 17. Thus, similar to holes 11, 12 of restrictor 10 described above, holes 19, 20, 21, 22 each define distance D from vertical line $L_V$. In addition, holes 19, 20, are aligned along horizontal line $L_{H1}$ and holes 21, 22 are aligned along horizontal line $L_{H2}$, and all of holes 19, 20, 21, 22 define distance D' from horizontal line $L_{H3}$. This arrangement allows any of holes 19, 20, 21, 22 to be aligned with vent orifice 7 when restrictor 18 is mounted to stud 8 (FIG. 1A) via bolt hole 17. To toggle between selective alignment of one of holes 19, 20, 21, 22 with orifice 7, restrictor is dismounted from stud 8, pivoted 180 degrees about one or both of vertical line $L_V$ and horizontal line $L_{H3}$, and remounted upon stud 8 via bolt hole 17.

Orientation feature 16 is provided on restrictor 18, but is also spaced from horizontal line $L_{H3}$ so as to create a visual distinction between one of holes 19, 20 being aligned with orifice 7 (which will result in orientation feature 16 being in an upper location) and one of holes 21, 22 being so aligned (which will result in orientation feature 16 being a lower location).

Figure 5:
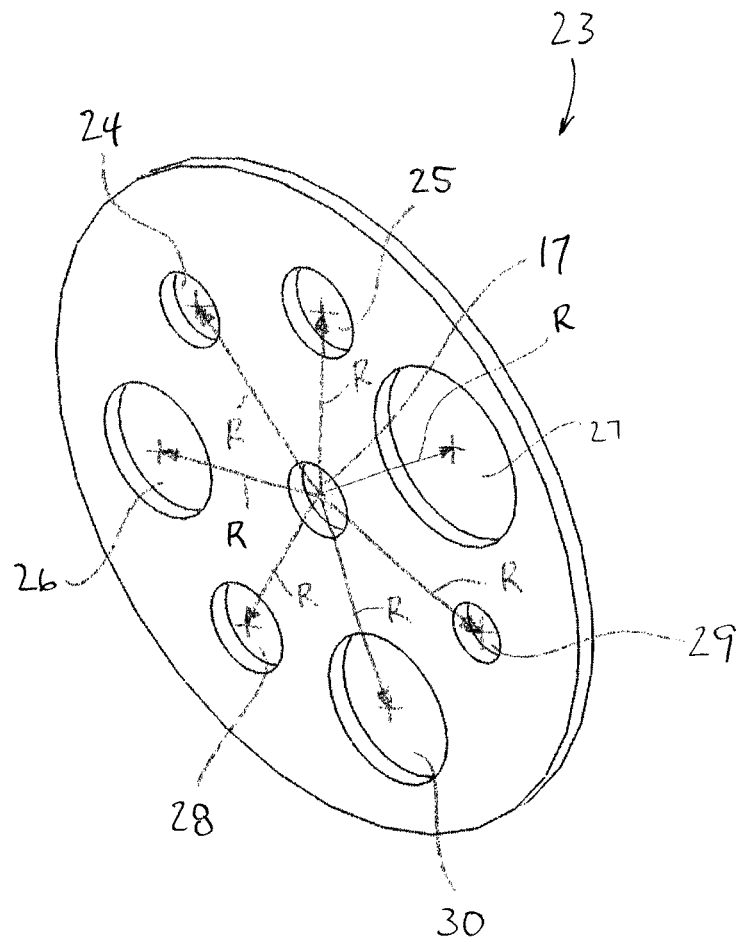
FIG. 5 is a perspective view of yet another vent restrictor plate having many different size flow holes.

FIG. 5 illustrates another alternative of restrictor plate 23 which can be rotated about bolt hole 17 to align any one of several different size flow holes 24, 25, 26, 27, 28, 29, 30 with vent orifice 7 at a time. Flow holes 24, 25, 26, 27, 28, 29, 30 each define radius R from their respective centers to the center of bolt hole 17, such that any of holes 24, 25, 26, 27, 28, 29, can be aligned with vent orifice 7 when bolt hole 17 is mounted to stud 8 in the manner described above. Restrictor plate 23 thus provides the user with a large number of possible flow hole diameters, thereby allowing "fine tuning" of the performance of steam cooker 1 to for any particular need or use.

Figure 6:
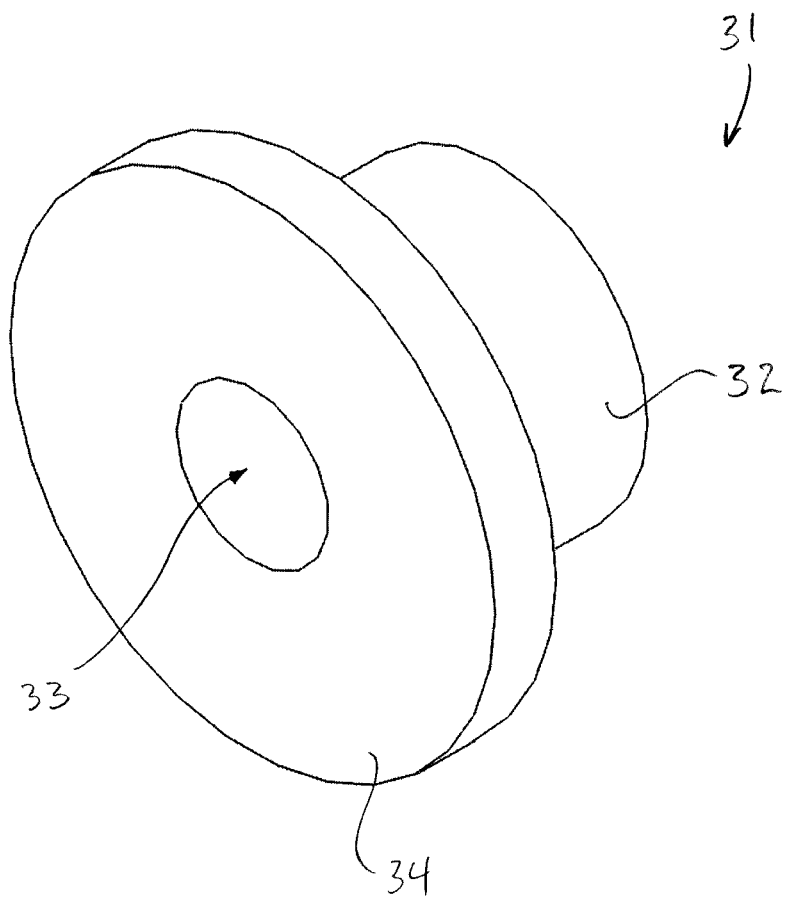
FIG. 6 is a perspective view of a restrictor plug with a single flow hole.

FIG. 6 illustrates another alternative restrictor in the form of plug 31. Plug 31 is installed by inserting plug boss 32 into vent orifice 7 to form a substantially fluid-tight seal therebetween. When so inserted, surface 34 of plug 31 is spaced from back wall 40 and faces inward toward cooking chamber 5. With plug 31 installed, the path for steam escape from chamber 5 to the atmosphere is via flow hole 33. Because flow hole 33 is smaller than vent orifice 7, the area of the steam-escape path is constricted by plug 31. It is contemplated that a series or kit of plugs 31 having differing holes 33 with differing cross-sectional areas may be provided, such that a user of steam cooker 1 can select a plug 31 from the kit having a hole 33 of a size appropriate to a particular application.

Figure 7:
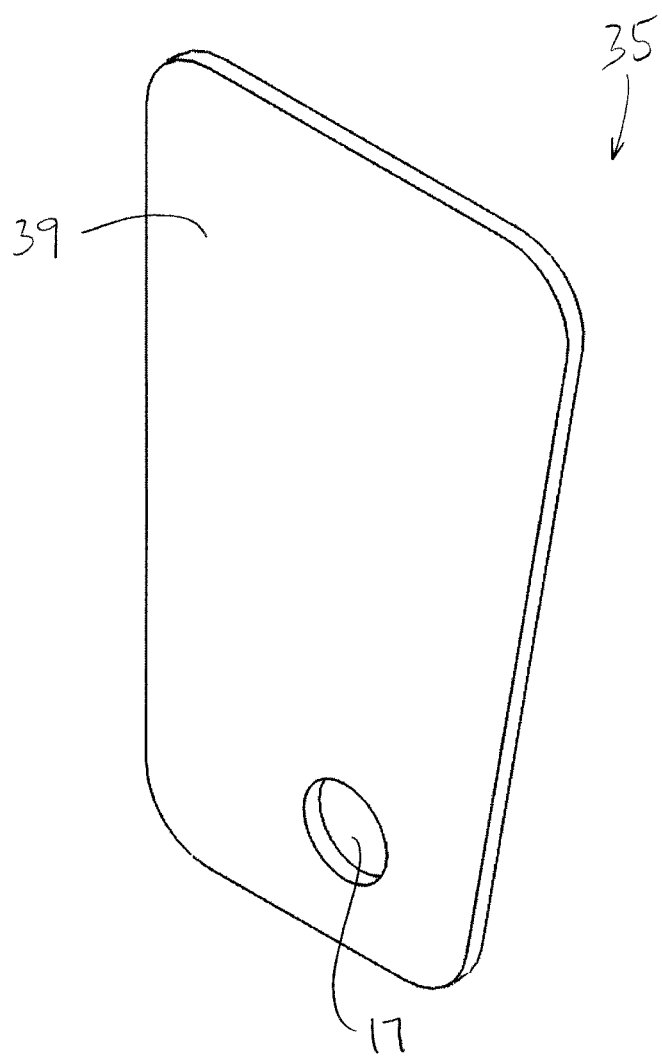
FIG. 7 is a perspective view of a restrictor plate without flow holes, in which the plate is sized to be partially positioned over the vent orifice shown in FIG. 1A to cause varying degrees of flow restriction.

FIG. 7 illustrates yet another alternative restrictor 35 without flow holes. Instead, restrictor 35 has a solid flange 39 which can be rotated about bolt hole 17 such that flange 39 selectively blocks all or a portion of vent orifice 7. Restrictor 35 may be positioned such that the coverage of vent orifice 7, expressed as a percentage of the total area of vent orifice 7, is as little as 0%, 10% or 20% coverage or as much as 50%, 60% or 70% coverage, or may be any value within any range defined by any of the foregoing coverage values. Advantageously, this "continuously variable" coverage gives the user an unlimited number of possible effective areas of vent orifice 7, thereby allowing "fine tuning" of the performance characteristics of steam cooker 1.

Figure 8:
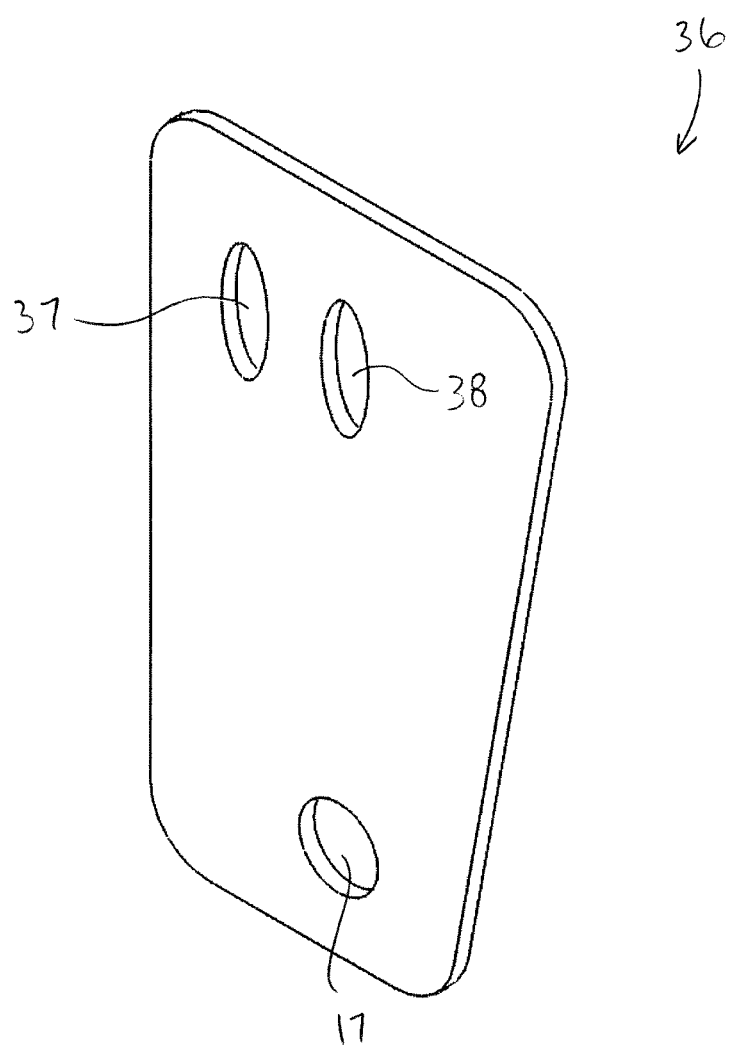
FIG. 8 is a perspective view of a restrictor plate containing two flow holes that can be positioned over the vent orifice one at a time or both together.

FIG. 8 illustrates still another alternative restrictor 36 with two non-circular, oblong flow holes 37 and 38 spaced from bolt hole 17, though it is contemplated that the non-circular shape of flow holes 37, 38 may take any shape. Flow holes 37 and 38 are shaped and positioned on restrictor 36 such that first and second flow holes 37, 38 may be independently or jointly aligned with vent orifice 7 depending on the rotational position of restrictor 36 about the axis of bolt hole 17. In one position, first flow hole 37 may abut rear wall 40 of cooking chamber 5 (FIG. 1A) such that no venting occurs through first flow hole 37, while second flow hole 38 is aligned with vent orifice 7. The opposite may also be achieved, with second flow hole 38 abutting rear wall 40 and first flow hole 37 aligned with orifice 7. A third configuration has both flow holes 37 and 38 aligned with vent orifice 7, such that venting can occur through both of holes 37, 38 simultaneously.

In one embodiment, that a set or kit of restrictors is provided with steam cooker 1 in accordance with the present disclosure. Such a kit includes multiple alternative restrictor designs, such as those detailed above, or several of a single restrictor design with each provided restrictor having variable flow hole configurations and/or diameters.

2. Steam Cooker Operation

A method of operation of steam cooker 1 will now be described.

Prior to activation, the effective area of vent orifice 7 can be ascertained based on the desired outcome of a particular application of steam cooker 1. As described in detail below in the "Working Examples" section, a large-area vent orifice 7 can be expected to cook and/or heat foods contained within cooking chamber 5 quickly, but at a higher cost in terms of energy and water consumption. Conversely, a smaller effective area can be expected to conserve energy and water, but will cook and/or heat foods more slowly compared to the larger-area options. Thus, if it is determined, for example, that flow hole 11 will not adequately meet the needs of the kitchen regarding cook times, restrictor 10 can be repositioned such that flow hole 12 is aligned with vent orifice 7 and flow hole 11 abuts back wall 40.

Also prior to activation, a water supply is provided to steam generator 14 (FIG. 1B). Water may be provided at the bottom of cooking chamber 5 (at floor 44, shown in FIGS. 1A and 1B), and heated within chamber 5 by a heater to produce steam. Alternatively, water may be provided to a remote steam generator 14 and routed into chamber 5, as shown schematically in FIG. 1B. Steam cooker 1 may include a water fill sensor operable to ascertain the level of water available to the heater of steam generator 14. If insufficient water is available to the heater as indicated by the water fill sensor, controller 106 may prevent the heater of steam generator 14 from activating to reduce the likelihood of damage to the heating system. It is contemplated that the heaters used in steam generator 14 may be electrical elements or gas-powered heaters, for example, or any other heater capable of converting liquid into steam.

Yet another action performed prior to activation of steam cooker 1 is supplying electrical power to steam cooker 1, including to computer 100 and steam generator 14. In a power-on state, power is relayed from a main power source to the heaters of steam generator 14, and to temperature sensor(s) 110 in cooking chamber 5 which can sense that water is in the unit to allow steam cooker 1 to activate. Power is also provided to controller 106 and associated relay switches, memory 108, user interface 2 and pressure sensor 102.

When controller 106 determines that water is available to the heater of steam generator 14, that all sensors are providing appropriate feedback, and that an indication has been received from user interface 2 that operation should begin, then the heater of steam generator 14 is activated and normal operation begins.

Items to be warmed or cooked are placed in cooking chamber 5. In the illustrated embodiment of FIG. 1A, the items are contained within hotel pans 3, which are supported by racks 4 as described above. Door 9 is closed and steam is produced in the bottom of steam cooker 1 or in a steam generator 14 in fluid communication with cooking chamber 5. After door 9 is closed, injection of steam pushes air out of cooking chamber 5 through vent orifice 7 to the surrounding atmosphere. Once the ambient air has been purged from cooking chamber 5, some of the steam injected into cooking chamber 5 continues to be vented through vent orifice 7.

In the case of restrictors which can be adjusted by pivoting about mounting stud 8 (such as restrictors 23, 35 and 36 described above), adjustment of the effective area of vent orifice 7 may be made while steam cooker 1 is operating. To accomplish this, a handle or pivot mechanism may pass through back wall 40 to the outside of steam cooker 1 for manipulation of the pivotal orientation of the restrictor from outside cooking chamber 5.

When cooking is complete, steam cooker 1 may be emptied of water and/or food juices by opening drain valve 6 and allowing such fluids to drain by gravity away from cooking chamber 5.

The cooking and/or heating functionalities of steam cooker 1 are illustratively accomplished by various programming methods written in to software 108 for controller 106. In an exemplary embodiment, steam cooker 1 selectively activates steam generator 14 depending on one or both of the inputs received from pressure sensor 102 and temperature sensor 110.

In a first mode of operation, referred to herein as the hold mode, controller 106 operates to maintain a constant water temperature in the bottom of steam cooker 1. As noted above, temperature is determined by temperature sensor 110, which may be a resistance temperature detector (RTD) in fluid communication with the water, for example. The user selects a desired temperature, which may be based on the particular food item contained within cooking chamber 5. When the signal from temperature sensor 110 to controller 106 indicates that the water temperature is lower than the user setpoint by a predetermined amount (such as, for example, by 0-5 degrees Fahrenheit), controller 106 engages steam generator 14 which injects steam into chamber 5, thereby raising the water temperature. When the signal from temperature sensor 110 to controller 106 indicates that the water temperature is at or above the user setpoint by a predetermined amount (such as, for example, by 0-5 degrees Fahrenheit), controller 106 disengages steam generator 14.

Figure 1C:
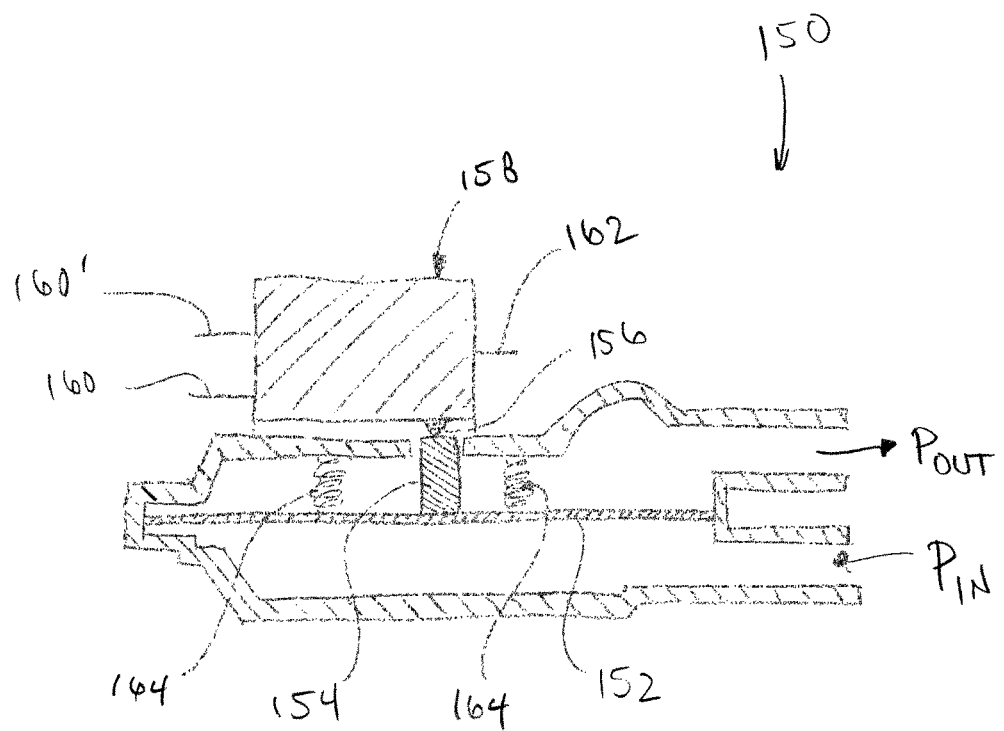
FIG. 1C is a section, elevation view of an exemplary pressure switch.

In a second mode of operation, referred to herein as cook mode, controller 106 uses automatic actuation of steam generator 14 to maintain a predetermined pressure within cooking chamber 5. The predetermined pressure setpoint, measured in inches of water column, may be as low as zero inches, 1 inch or 2 inches, or may be as high as 6 inches, 10 inches or 30 inches, or may be any pressure within any range defined by any of the foregoing values. In one exemplary embodiment, the pressure maintained within steam chamber 5 is 0.5 inch of water column. Pressure is determined by pressure sensor 102, which is fluidly connected to cooking chamber 5 via aperture 103 formed in side wall 42 (FIG. 1B). An exemplary pressure switch compatible with steam cooker 1 is the RSS-495/498 Air Pressure Sensing Switch available from Cleveland Controls of Cleveland, Ohio, shown in the "Cleveland Controls, Series RSS-495/498, OEM AIR PRESSURE SENSING SWITCHES WITH FIXED SET POINT" brochure submitted on even date herewith, the entire disclosure of which is hereby expressly incorporated herein by reference. A schematic representation of such an exemplary pressure sensor 102 is shown in FIG. 1C as pressure module 150, which performs the function of pressure sensor 102 but also acts as controller 106. Pressure module 150 includes internal diaphragm 152 which undergoes a balloon-like expansion when a pressure differential exists between pressure input $P_{IN}$ on one side of diaphragm 152 (which is fluidly connected to cooking chamber 5) and pressure output $P_{OUT}$ on the other side of diaphragm 152 (which is fluidly connected to the surrounding atmosphere). When diaphragm 152 is sufficiently expanded by an elevated pressure at input $P_{IN}$ (the pressure in cooking chamber 5) compared to the pressure at output $P_{OUT}$ (atmospheric pressure), such expansion moves actuator 154 upwardly and into button 156 of switch 158. Switch 158 includes power terminals 160, 160' for connection of power thereto, and control terminal 162 which is selectively energized depending on the state of button 156. When button 156 is pressed by actuator 154, control terminal 162 sends or interrupts a signal to steam generator 14 to activate or deactivate the injection of steam into chamber 5 as described below. Alternatively, control terminal 162 can send a signal to a separate controller 106. The pressure $P_{IN}$ needed to engage or disengage the switch may be calibrated by biasing diaphragm 152 in one direction with springs 164 or another biasing element. The higher the force provided by springs 164 as configured in pressure module 150, the more pressure is needed at PIN and compared to POUT to allow actuator 154 to reach and depress button 156. In one exemplary embodiment, the force provided by springs 164 can be altered by partially compressing or "preloading" springs 164.

Controller 106 receives a signal from pressure sensor 102, and compares this signal with a corresponding setpoint signal corresponding to the user's desired pressure within chamber 5. This desired pressure may be input at user interface 2 and relayed to controller 106, where it can be stored in memory 104. If the actual pressure in chamber 5, as measured by pressure sensor 102, is lower than the desired setpoint by a predetermined amount (such as by 0-0.1 inches of water column), controller 106 engages steam generator 14 which raises the pressure in chamber 5 until the setpoint is achieved. Conversely, if the actual pressure is at the setpoint or above the setpoint by a predetermined amount (such as by 0-0.1 inches of water column), controller 106 disengages steam generator 14 until the pressure falls below the setpoint.

Where pressure module 150 is employed for pressure sensor 102 according to the exemplary specification set forth above, it is not necessary to specify an explicit predetermined deviation from the nominal setpoint for engagement or disengagement of steam generator 14, as pressure module 150 has a balanced sensitivity which acts to prevent undue haste or delay in engaging or disengaging steam generator 14 based on small deviations from the nominal setpoint. Thus, pressure module 150 will activate and deactivate when the pressure in cooking chamber 5 reaches a pressure within a predetermined deviation from the setpoint, with the deviation set by the mechanical properties of the structures within pressure module 150, e.g., diaphragm 152 and springs 164. This exemplary pressure module 150 provides a low-cost option operable to both determine the pressure in chamber 5, compare the pressure to the setpoint, and output a signal to steam generator 14. In addition, pressure module 150 does not need to be adjusted for ambient pressure changes, such as those which occur at varying altitudes.

In other systems using electrical controls, these predetermined deviations may be set electronically. In either case, the predetermined deviation may be zero.

In this exemplary embodiment, pressure module 150 can act as controller 106 because pressure module 150 can directly compare pressure in cooking chamber 5 against the setpoint. In this case, the setpoint is mechanically determined, e.g., by the biasing force of springs 164, and the configuration of diaphragm 152 as described above. By contrast, in systems using electronic controllers, the setpoint may be a voltage value output by a switch or sensor, for example. Similarly, in this exemplary embodiment, the signal provided to controller 106 can be in the form of a state of actuator 154 of diaphragm 152 (i.e., expanded by a high pressure differential between $P_{IN}$ and $P_{OUT}$, or non-expanded by a low pressure differential between $P_{IN}$ and $P_{OUT}$). In other systems using electronic controllers, the signal may be a voltage value, such as 0-10 VDC, for example.

Thus, when a setpoint pressure in cooking chamber 5 is achieved during a heating cycle (i.e., when steam generator 14 is active), diaphragm 152 of pressure module 150 directly expands sufficiently to actuate switch 158 which in turn shuts off steam generator 14. Conversely, when the pressure $P_{IN}$ in chamber 5 falls below the mechanically determined setpoint, diaphragm 152 of pressure module 150 contracts to deactivate switch 158 which in turn activates steam generator 14.

Maintaining constant pressure confers advantages to the cooking process. For example, a food item placed within cooking chamber 5 can only accept steam energy at a certain rate, depending on various physical factors such as surface area and temperature of the food item. When cooking begins, room temperature or frozen food items may absorb a relatively large amount of heat, and the amount of steam required to maintain constant pressure in chamber 5 is concomitantly high. However, as the surface of the food items are warmed and the heating process shifts to warming the interior food item volume by convection, less heat is absorbed and less steam is required to maintain chamber pressure. The constant-pressure functionality of steam cooker 1 is automatically responsive to this changing heat input requirement. At the same time, the adjustability of the effective area of orifice vent 7 changes the rate of heat moving through the overall system, thereby selectively lowering cooking time or energy/water consumption in concert with the constant-pressure functionality.

Controller 106 may optionally receive a signal from a door switch (not shown) which indicates whether door 9 is opened or closed. In one embodiment, if the door switch indicates to controller 106 that door 9 is open, steam generator 14 is prevented from engaging by controller 106.

Using pressure sensor 14 as the primary source of input for controller 106, in combination with the adjustable area of vent orifice 7 via a restrictor (e.g., restrictor 10 shown in FIGS. 2 and 3) results in a highly effective and versatile steam cooking device. As noted above, controller 106 uses signals from pressure sensor 102 to maintain substantially constant pressure within cooking chamber 5 of steam cooker 1. To maintain this substantially constant pressure while steam is allowed to escape through vent orifice 7, steam generator 14 must produce and inject at least as much steam as is vented.

As noted above, the effective size of vent orifice 7 determines the amount of steam that is vented. It takes energy and water to generate the steam that is vented, so the size of the vent affects the energy efficiency and water usage of the cooker. If a user wishes to reduced energy and/or water consumption, a simple adjustment of restrictor 10 (or an alternative restrictor design as noted above) is the only action needed to accomplish this result. Controller 106 will maintain its pressure setpoint with less steam generation, because less steam is being vented. Conversely, the flow of steam through cooker 1 may also be increased by adjustment of restrictor 10 (or an alternative restrictor design as noted above), thereby decreasing the time needed to cook or heat a given item to a given temperature (as set forth below in the Working Examples).

WORKING EXAMPLES

The following non-limiting Examples illustrate various features and characteristics of the present design, which are not to be construed as limited thereto.

Steam cookers cook significantly faster when more steam is allowed to vent, provided the steam cooker is controlled to maintain a constant pressure (as described above). However, the large vent orifices which lead to large steam flows also increase water and energy consumption. Some fast paced kitchens using a steam cooker to warm or cook single servings of food on demand may choose low cooking times despite high water or energy consumption. Other kitchens, such as those cooking large batches of food or those for which operational cost is more important, will choose water and energy conservation despite a relatively longer cooking time.

As set forth in detail above, the present disclosure provides a steam cooking device which offers a large vent whose size (i.e., area) can be restricted as needed while maintaining a constant pressure within the cooking chamber. Thus both types of needs, i.e., fast cooking and water and energy efficiency, can be met by steam cooker 1 described above. By making the degree of restriction user adjustable, steam cooker 1 can be adjusted by the user for their particular kitchen to best meet their needs for cooking speed and water and energy efficiency. The following examples demonstrate this variability and versatility of operation.

Example 1

Effect of Vent Orifice Area on Cooking Time of a Nylon Ball

The size of the vent orifice 7 in the steam cooker 1 influences several characteristics of steam cooker 1, including cook speed, energy efficiency, water consumption, lime formation and hood/auto-fill recommendations. These relationships are summarized in the Table 1 below.

TABLE 1

Operational Characteristics of Steam Cooker with Varying Orifice Size

| Characteristic | Smaller Effective Orifice - Result | Larger Effective Orifice - Result |
|---|---|---|
| cook speed | Slower | Faster |
| Energy efficiency | Higher | Lower |
| Water consumption | Lower | Higher |
| Lime formation | Lower | Higher |
| Hood, auto-fill needs | Lower | Higher |

As shown, a larger effective orifice was found to increase cooking speed at the expense of reduced energy efficiency, increased water consumption, increased lime formation and increased steam vented. As the amount of steam vented increases, the more likely a hood will be needed to mitigate or prevent condensation on walls or ceilings near steam cooker 1.

The size of the vent orifice tested in this Example was 5/16 inch. For changes in the effective vent orifice size to be effective, the vent piping must have an internal diameter larger than the size of the vent hole in the chamber. Currently the minimum internal diameter of the piping is 7/16 inch present in a street elbow. This street elbow could be replaced with a larger elbow to make larger vent orifices effective.

With regard to water consumption, the effect of changing effective orifice sizes is set forth in Table 2 below. As illustrated, water consumption increases as orifice size increases.

TABLE 2

Effective Orifice Size Effect on Water Consumption

| Orifice size | Water consumption, gal./hr |
|---|---|
| .175 | 0.30 |
| .25 | 0.39 |
| .31 (5/16) | 0.48 |
| .50 with street elbow | 0.75 |
| .50 w/o street elbow | 0.91 |
| .56 | 1.10 |
| .63 | 1.12 |

Lime formation was found to be proportional to water usage. For example, if water consumption increases 50%, lime formation increases 50%. If water consumption doubles, lime formation doubles.

With regard to energy efficiency, full-load potato cooking energy efficiency of the current steam cooker 1 with an effective orifice size of 5/16 inch was found to be 70%. An analogous cooking energy efficiency of the current steam cooker 1 with an effective orifice size of 0.63 inch was found to be 54%.

Figure 9:
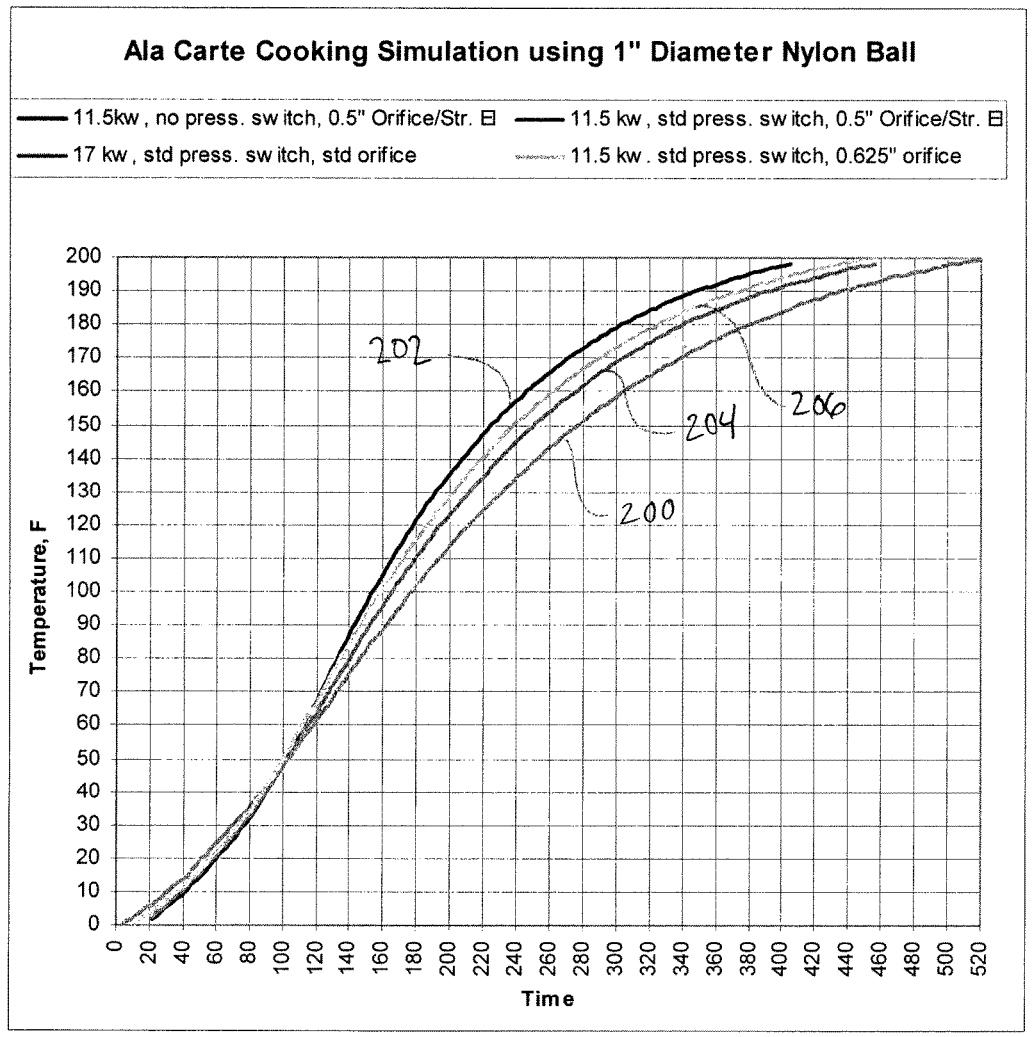
FIG. 9 is a graph illustrating cooking times for a 1-inch diameter nylon ball using various cooker configurations.

Turning now to FIG. 9, the results of testing using a nylon ball with a thermocouple cemented in the center are presented. The nylon ball is used to simulate ala carte tests because the results are easily reproducible.

Curve 200 shows results for a standard 17 kW steam cooker with the standard effective orifice size of 5/16", and pressure switch 102 described above. As illustrated, this configuration took about 340 seconds to get the ball to 170° F.

Curve 202 illustrates results for steam cooker 1 having an 11.5 kW steam generator 14, with pressure switch 102 disconnected and an effective orifice size of 0.5 inch. With the pressure switch disconnected the heater runs continuously, thereby producing maximum steam for given the 11.5 kW input. This configuration only took 270 seconds to get the ball to 170° F.

Curve 204 illustrates results for steam cooker 1 having an 11.5 kW steam generator 14, with pressure switch 102 attached and operational, and with an effective orifice size of 0.5 inch and the flow restricting street elbow. It took about 305 seconds to get the ball to 170° F., significantly faster than the standard steam cooker (shown at curve 200 and described above).

Curve 206 illustrates results for steam cooker 1 having an 11.5 kW steam generator 14, with pressure switch 102 attached and operational, and with an effective orifice size of 0.63 inch and the standard elbow. This configuration took about 290 seconds to get the ball to 170° F. This is a little bit better than the previous configuration (curve 204), but not as good as the best results in which steam was applied continuously (curve 202).

Example 2

Effect of Vent Orifice Area on Cooking Time of Various Food Items

Additional data on cooking speed as influenced by effective orifice size in steam cooker 1 was collected for various food items. Foods tested include frozen peas, frozen California blend vegetables, hot dogs and bratwurst.

All of these tests were for comparably light loads. The frozen pea tests were run with five pounds of peas in a perforated pan. California blend used four pounds of vegetables in a single perforated pan. Hot dogs and bratwurst tests used one pound of meat in a perforated pan. There were 10 hot dogs per pound and 6 bratwurst links per pound. Most of the tests were performed with pressure switch 102 connected and operational, but for some of the tests pressure switch 102 was disconnected.

Hot dogs were Oscar Mayer brand Classic Beef Franks containing 13 grams fat per hot dog. There were 10 hot dogs per pound. Average diameter was 0.80 inch. Bratwurst were Hillshire Farms brand smoked bratwurst containing 22 grams fat per bratwurst. There were six bratwurst per pound with an average diameter of 1.02 inches.

Steam cooker 1 with a steam generator 14 utilizing power input of 17 kW was used for all the tests. Vent orifice 7 was 5/8 inch diameter and the street elbow in the vent piping was replaced with a 3/4 inch elbow and close nipple so the minimum internal diameter in the vent was also 5/8 inch. To effectively reduce orifice size, Teflon plugs were drilled out to the desired size. These plugs were pushed into the vent hole from the inside of the steam chamber.

For the tests without pressure switch 102, one of the heaters in the rear of the cast heater system was disconnected to simulate steam cooker 1 with a power rating of 11.5 kW.

A type T hypodermic thermocouple probe was inserted in the center of the hot dogs and bratwurst from the end. Temperature was monitored with a data logger. The temperature of six meat links were monitored in each test. Average cook time was determined by eliminating the fastest and slowest responses and averaging the time the other four links took to reach 180° F.

Final temperature of peas and California blend were determined with the calorimeter method desired in ASTM Method 1484. Ten pounds of water were used in the calorimeter for each of the runs. An RTD thermometer was used to measure water temperature in the calorimeter. The contents of the calorimeter were stirred with a section of 1¼ inch PVC pipe. The RTD probe was fastened to the PVC pipe for easy temperature measurement.

Finding the time required to heat the vegetables to 180-190 degrees was done by trial and error. A test was run at a chosen cook time and if the final temperature of the vegetables was too high, the test was repeated with a shorter cook time. This was repeated as often as needed.

Power measurements were also recorded for each test. They are shown in the tables below with calculated energy cooking efficiency.

Most tests were performed only once. However the test on California blend vegetables with the 0.44 inch effective orifice size was run twice in order to get some measure of reproducibility. The results are shown in the tables below.

Figure 10:
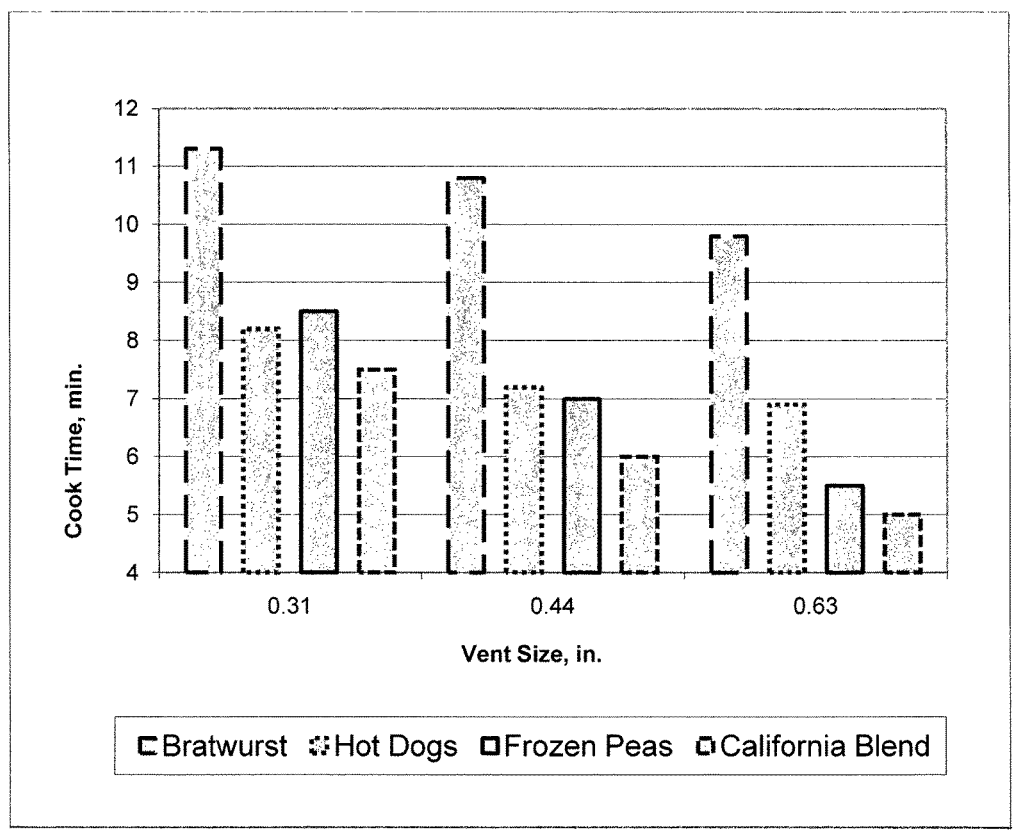
FIG. 10 is a graph illustrating cooking times for various food items using various cooker configurations.

Cooking time results are shown below in Tables 3-6 and presented graphically in FIG. 10.

TABLE 3

Heating Time for Frozen Peas

| Effective Orifice Diameter, in | Pressure Switch | Time to 180-190° F. |
|---|---|---|
| .31 | Yes | 8.5 minutes |
| .44 | Yes | 7.0 minutes |
| .63 | Yes | 5.5 minutes |
| .63 | No | 5.0 minutes |

TABLE 4

Heating Time for Frozen California Blend Vegetables

| Effective Orifice Diameter, in | Pressure Switch | Time to 180-190° F. |
|---|---|---|
| .31 | Yes | 7.5 minutes |
| .44 | Yes | 6.0 minutes |
| .63 | Yes | 5.0 minutes |

TABLE 5

Heating Time for Hot Dogs, Refrigerated

| Effective Orifice Diameter, in | Pressure Switch | Time to 180° F. |
|---|---|---|
| .31 | Yes | 8.2 minutes |
| .44 | Yes | 7.2 minutes |
| .63 | Yes | 6.9 minutes |
| .63 | No | 6.1 minutes |

TABLE 6

Heating Time for Bratwurst, Refrigerated

| Effective Orifice Diameter, in | Pressure Switch | Time to 180° F. |
|---|---|---|
| .31 | Yes | 11.3 minutes |
| .44 | Yes | 10.8 minutes |
| .63 | Yes | 9.8 minutes |
| .63 | No | 9.9 minutes |

Figure 11:
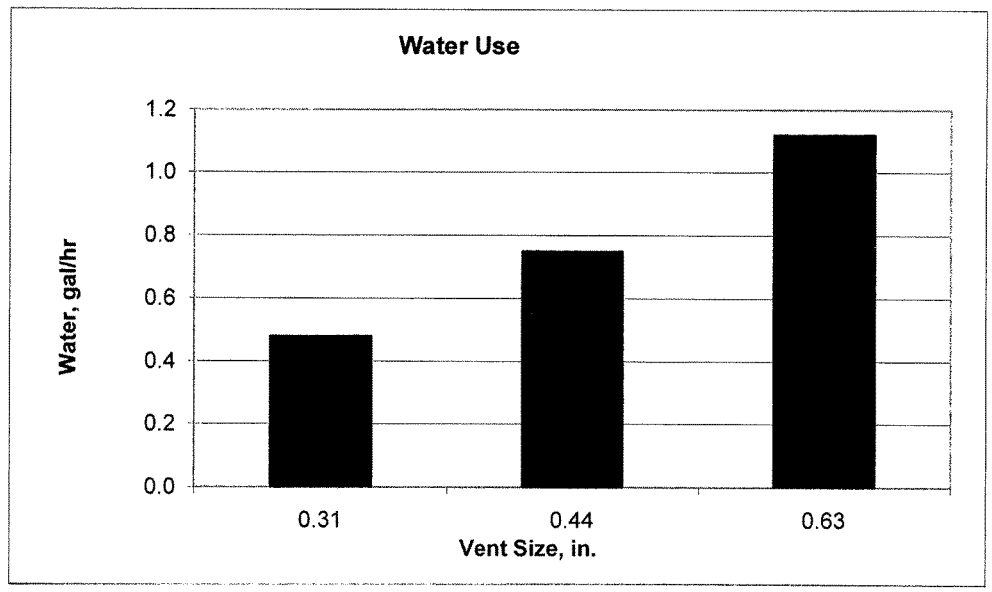
FIG. 11 is a graph illustrating water consumption for various cooker configurations.
Figure 12:
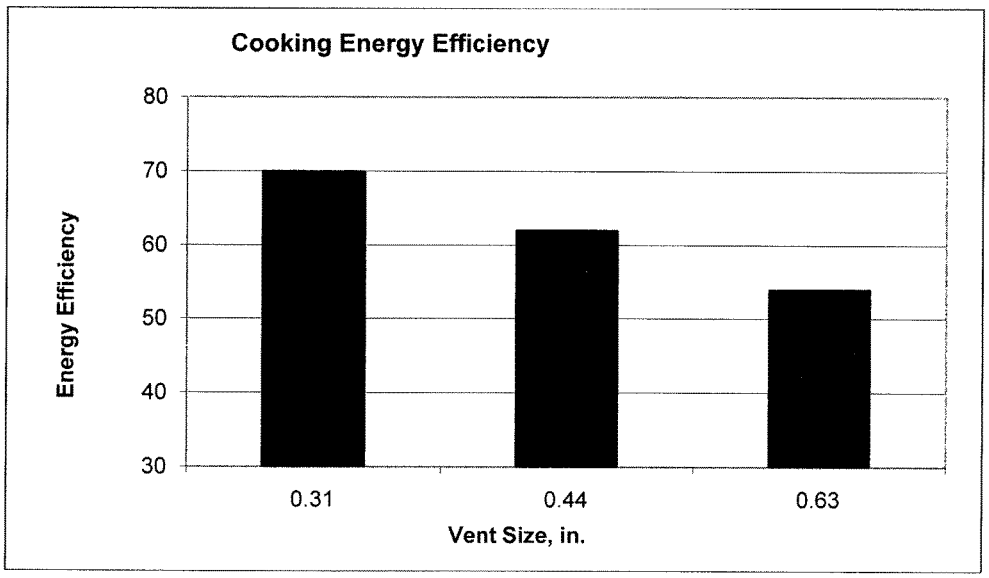
FIG. 12 is a graph illustrating energy consumption for various cooker configurations.

Further results are shown in Table 7 below. Cooking efficiency results are presented in FIG. 12, and water consumption results are presented in FIG. 11.

TABLE 7

Additional Test Data for Vegetable Test Specimens

| Orifice Size, in | Cook Time, min. | Pressure Switch | Final Temperature | Energy Used, kW-Hr | Cooking Efficiency |
|---|---|---|---|---|---|
| Peas | | | | | |
| 0.31 | 8.5 | Yes | 185.0 | 650.6 | 61.0% |
| 0.44 | 7.0 | Yes | 188.0 | 699.0 | 58.7% |
| 0.63 | 5.5 | Yes | 182.0 | 697.3 | 56.3% |
| 0.63 | 5.0 | No | 183.4 | 880.9 | 45.8% |
| California blend | | | | | |
| 0.31 | 7.5 | Yes | 186.8 | 616.0 | 51.5% |
| 0.44 | 6.0 | Yes | 189.2 | 624.1 | 51.3% |
| 0.44 | 6.0 | Yes | 184.6 | 603.4 | 50.7% |
| 0.63 | 5.0 | Yes | 184.9 | 641.8 | 49.7% |

Single pan ice melt tests were also performed. With the 0.31 inch diameter effective orifice diameter, it took 9.1 minutes to melt the ice and heat the water to 170° F. With the 0.63 inch effective orifice diameter, it took 5.9 minutes to melt the ice and heat the water to 170° F. With a 0.63 inch effective orifice diameter, 11.5 kW steamer and pressure switch 102 disconnected it took 6.0 minutes and with the same effective orifice diameter, 17 kW steamer and pressure switch 102 disconnected it took just 4.5 minutes to melt the ice and heat the water to 170° F.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A steam cooker comprising:
    a cooking chamber having a vent orifice in fluid communication with and extending between an interior of the cooking chamber and an atmosphere outside the cooking chamber to vent steam from the interior of the cooking chamber to the atmosphere as a function of a pressure of the interior of the cooking chamber, the vent orifice positioned in an upper half of the cooking chamber and defining a variable effective orifice area;
    a pressure sensor in fluid communication with the cooking chamber, the pressure sensor defining a first state corresponding to pressure below a pressure set point and a second state corresponding to pressure above the pressure set point, the pressure sensor outputting a pressure signal indicative of whether the pressure sensor is in the first state or the second state; and
    a steam generator including a heater, the steam generator being in fluid communication with the cooking chamber, such that the steam generator is configured to inject steam into the cooking chamber,
    a controller operably connected to the pressure sensor and the steam generator, the controller receiving the pressure signal from the pressure sensor and programmed with a predetermined deviation from the pressure set point indicative of a need to activate the steam generator,
    the controller programmed to output an activation signal to the steam generator when the pressure sensor is in the first state such that the steam generator injects steam into the cooking chamber until the pressure in the cooking chamber reaches a pressure within the predetermined deviation from the set point, and programmed to not output the activation signal when the pressure sensor is in the second state such that the steam generator does not inject steam into the cooking chamber until the pressure in the cooking chamber falls to a pressure not within the predetermined deviation from the set point, the controller reacting to a change in pressure in the cooking chamber resulting from an adjustment of the variable effective orifice area by selectively outputting or not outputting the activation signal depending on the size of the variable effective orifice area.

2. The steam cooker of claim 1, further comprising a restrictor selectively positionable over the vent orifice, the restrictor selectively covering at least a portion of the vent orifice to define the effective orifice area.

3. The steam cooker of claim 2, wherein the restrictor comprises a plate having at least one flow hole formed therethrough, the at least one flow hole being alignable with the vent orifice and smaller than the vent orifice, such that the at least one hole defines the effective orifice area.

4. The steam cooker of claim 3, wherein the restrictor plate is configured to be static in operation of the steam cooker.

5. The steam cooker of claim 3, wherein the restrictor comprises a plurality of flow holes each defining a different flow hole area, any one of the flow holes being selectively alignable with the vent orifice at one time.

6. The steam cooker of claim 5, wherein the restrictor comprises a bolt hole positioned equidistant from each of said plurality of flow holes, and the steam cooker comprises a stud extending from a wall of the cooking chamber spaced from the vent orifice, the plurality of flow holes being spatially arranged with respect to the bolt hole such that any one of the plurality of flow holes is aligned with the vent orifice when the stud is received in the bolt hole.

7. The steam cooker of claim 6, wherein the plurality of holes are equidistant from the bolt hole, such that any one of the plurality of flow holes is alignable with the vent orifice by rotating the restrictor about a longitudinal axis of the stud.

8. The steam cooker of claim 6, wherein the restrictor comprises a plate having a pair of opposed faces, the plurality of holes formed in the pair of opposed faces and equidistant from the bolt hole, such that any one of the plurality of flow holes is alignable with the vent orifice by selectively abutting one of the pair of opposed faces against a wall of the cooking chamber adjacent the vent orifice.

9. The steam cooker of claim 2, wherein the restrictor comprises a plug having at least one flow hole formed therethrough, the plug being receivable within the vent orifice such that the at least one flow hole is aligned with the vent orifice, the at least one flow hole being smaller than the vent orifice such that the at least one flow hole defines the effective orifice area.

10. The steam cooker of claim 2, wherein the steam cooker comprises a stud extending from a wall of the cooking chamber spaced from the vent orifice, and the restrictor comprises a bolt hole with a flange extending away from the bolt hole, the flange spatially arranged with respect to the bolt hole such that the flange is selectively positionable to cover a percentage of the vent orifice when the stud is received in the bolt hole.

11. The steam cooker of claim 10, wherein the flange is rotatable about a longitudinal axis of the stud to cover between 0% and 70% of the vent orifice.

12. The steam cooker of claim 1, wherein the controller reacts to an enlargement of the variable effective orifice area by outputting the activation signal such that the steam generator increases the steam throughput to compensate for steam escaping from the orifice.

13. The steam cooker of claim 12, wherein the enlargement of the variable effective orifice area corresponds to an increase in power and water consumption by the steam generator and a corresponding decrease in cooking time for a food item contained within the cooking chamber.

14. The steam cooker of claim 1, wherein the controller reacts to a reduction of the variable effective orifice area by not outputting the activation signal such that the steam generator preserves a quantity of steam within the cooking chamber.

15. The steam cooker of claim 14, wherein the reduction of the variable effective orifice area corresponds to a decrease in power and water consumption by the steam generator and a corresponding increase in cooking time for a food item contained within the cooking chamber.

16. The steam cooker of claim 1, wherein:
the controller reacts to an enlargement of the variable effective orifice area by outputting the activation signal such that the steam generator increases the steam throughput to compensate for steam escaping from the orifice; and
the controller reacts to a reduction of the variable effective orifice area by not outputting the activation signal such that the steam generator preserves a quantity of steam within the cooking chamber.

17. The steam cooker of claim 16, wherein:
the enlargement of the variable effective orifice area corresponds to an increase in power and water consumption by the steam generator and a corresponding decrease in cooking time for a food item contained within the cooking chamber; and
the reduction of the variable effective orifice area corresponds to a decrease in power and water consumption by the steam generator and a corresponding increase in cooking time for a food item contained within the cooking chamber.

18. A steam cooker comprising:
a cooking chamber having a vent orifice in fluid communication with and extending between an interior of the cooking chamber and an atmosphere outside the cooking chamber to vent steam from the interior of the cooking chamber to the atmosphere as a function of a pressure of the interior of the cooking chamber, the vent orifice positioned in an upper half of the cooking chamber and defining a variable effective orifice area;
means for generating steam, the means for generating steam being in fluid communication with the cooking chamber;
means for comparing pressure in the cooking chamber to a set point and outputting a pressure signal indicative of whether the pressure in the cooking chamber is above or below the set point;
means for controlling an injection of steam produced by the means for generating steam, based on results of a comparison performed by the comparing means, the means for controlling injection of steam comprising a controller programmed to activate the means for generating steam to inject steam into the cooking chamber when the means for comparing pressure determines that the pressure in the cooking chamber is below the set point, the controller further programmed to deactivate the means for generating steam when the means for comparing pressure determines that the pressure in the cooking chamber is at or above the set point; and means for selectively varying the effective orifice area, the controller reacting to a change in pressure in the cooking chamber resulting from an adjustment of the varying means by selectively activating or deactivating the means for generating steam depending on the size of the variable effective orifice area.

19. The steam cooker of claim 18, wherein the means for selectively varying the effective orifice area comprises at least one of: a plate having a plurality of flow holes adapted to selectively align with the vent orifice; a plate having a flange adapted to selectively block a portion of the vent orifice; and a plug sized to be received in the vent orifice, the plug having a flow hole therethrough.

20. The steam cooker of claim 18, wherein the means for controlling injection of steam cooperates with the means for selectively varying the effective orifice area such that an increase in effective orifice area reduces cooking time of items in the cooking chamber, and a decrease in effective orifice area reduces at least one of water consumption and energy consumption of the steam cooker.

21. The steam cooker of claim 18, wherein the means for comparing comprises a diaphragm of a pressure module, and the means for controlling comprises a switch selectively actuated by expansion of the diaphragm.

22. The steam cooker of claim 18, the means for selectively varying the effective orifice area cooperates with the means for controlling to provide a means for selecting between a high-power operation mode and a low-power operation mode, wherein:

the high-power operation mode corresponds to a relatively larger effective orifice area with a relatively increased consumption of power and water by the means for generating steam, such that a first cooking time for a food item contained within the cooking chamber is achieved; and the low-power operation mode corresponds to a relatively smaller effective orifice area with a relatively decreased consumption of power and water by means for generating steam, such that a second cooking time for the food item contained within the cooking chamber is achieved, the first cooking time faster than the second cooking time.

* * * * *